United States Patent [19]
Moledina et al.

[11] Patent Number: 5,903,675
[45] Date of Patent: May 11, 1999

[54] SYSTEM AND METHOD FOR COMPRESSING DATA USING A DYNAMICALLY CHANGING COMPRESSION WINDOW

[75] Inventors: Riaz A. Moledina, Woodside; Stuart L. Claassen, Santa Clara; Kok S. Chen, Sunnyvale, all of Calif.

[73] Assignee: Apple Computer, Inc., Cupertino, Calif.

[21] Appl. No.: 08/770,899

[22] Filed: Dec. 20, 1996

[51] Int. Cl.$^6$ ........................................... G06K 9/00
[52] U.S. Cl. ............................. 382/239; 382/190
[58] Field of Search ..................... 382/173, 203, 382/224, 177, 229, 245, 155, 165, 159, 168, 170, 171, 172, 176, 178, 179, 180, 181, 185, 186, 187, 190, 191, 192, 195, 196, 197, 198, 199, 201, 202, 204, 217; 358/261.3–263, 432, 470, 261.1, 409, 433; 704/253, 257; 380/1

[56] References Cited

U.S. PATENT DOCUMENTS

| | | | |
|---|---|---|---|
| 4,410,916 | 10/1983 | Pratt et al. | 358/263 |
| 4,463,386 | 7/1984 | Goddard et al. | 358/261 |
| 4,481,593 | 11/1984 | Bahler | 364/513.5 |
| 4,568,983 | 2/1986 | Bobick | 358/260 |
| 4,610,025 | 9/1986 | Blum et al. | 382/9 |
| 4,668,995 | 5/1987 | Chen et al. | 358/282 |
| 5,390,259 | 2/1995 | Withgott et al. | 382/224 |
| 5,408,542 | 4/1995 | Callahan | 382/56 |

*Primary Examiner*—Leo H. Boudreau
*Assistant Examiner*—Bijan Tadayon
*Attorney, Agent, or Firm*—Burns, Doane, Swecker & Mathis, L.L.P.

[57] ABSTRACT

A system and method for efficient image compression begins by segmenting an input image into a current and previous window using a loading module. An encoding module compares the current and the previous window. If the current window does not match the previous window, the encoding module alters the dimensions of the current and previous windows and repeats the comparison. If a match is found, the encoding module instructs the loading module to continue to segment the image using the altered window dimensions. In this manner, the system's segmenting is in step with the natural cycle of repetition in the input image.

20 Claims, 3 Drawing Sheets

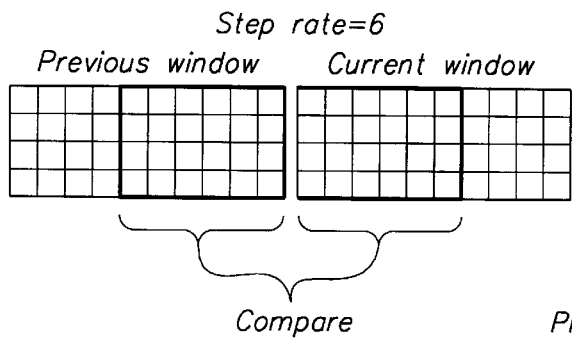
FIG. 3A
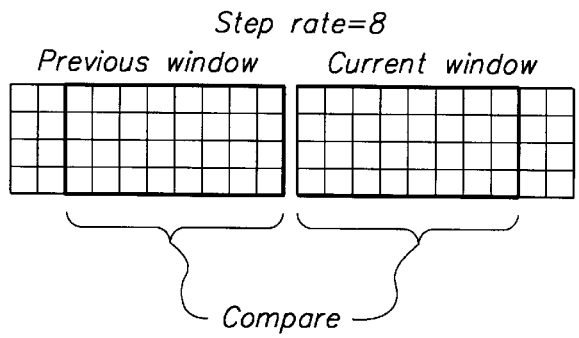
FIG. 3B
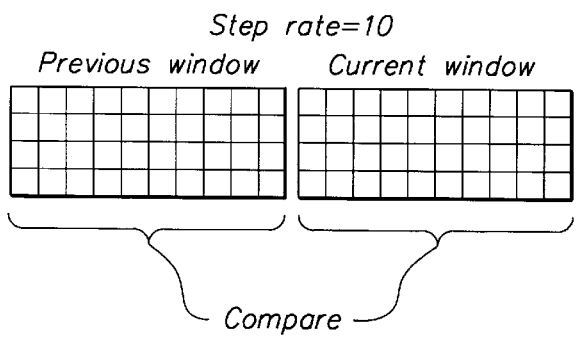
FIG. 3C
| Current Step rate | CV* | Current 10 | 8 | 6 | Encoding | New Step rate |
|---|---|---|---|---|---|---|
| 6 | 0 | 0 | 0 | 0 | No change | 6 |
|   | 0 | 0 | 0 | 1 | No change | 6 |
|   | 0 | 0 | 1 | X | Lower | 8 |
|   | 0 | 1 | X | X | Higher | 10 |
| ↓ | 1 | X | X | X | No change | 6 |
| 8 | 0 | 0 | 0 | 0 | No change | 8 |
|   | 0 | 0 | 0 | 1 | Lower | 6 |
|   | 0 | 0 | 1 | X | No change | 8 |
|   | 0 | 1 | X | X | Higher | 10 |
| ↓ | 1 | X | X | X | No change | 8 |
| 10 | 0 | 0 | 0 | 0 | No change | 10 |
|   | 0 | 0 | 0 | 1 | Lower | 6 |
|   | 0 | 0 | 1 | X | Higher | 8 |
|   | 0 | 1 | X | X | No change | 10 |
| ↓ | 1 | X | X | X | No change | 10 |
FIG. 4

SYSTEM AND METHOD FOR COMPRESSING DATA USING A DYNAMICALLY CHANGING COMPRESSION WINDOW

BACKGROUND OF THE INVENTION

1. Field of the Invention

The present invention generally relates to the compression of digital data for efficient transmission or storage, and more particularly to the compression of data whose format, such as block size, is not known beforehand.

2. Description of the Prior Art

A message may be represented in digital form using any number of well known coding methods. Typically, the objective is to choose the coding technique which expresses the digital data using the least number of bits possible. Representing the data in its most concise form enables a system to process and transmit the data more quickly, and to store the data using the least amount of storage space.

Often a message is input to a digital system in a form which is less than optimal. The system must then convert the input data stream to a more compact form. This processing is known as data compression (or sometimes simply referred to as source encoding).

Several different compression techniques are known in the art. In one common technique, a digital message is broken into a series of blocks, and each block is separately encoded by reference to a previously encoded block. For instance, in the well-known Lempel-Ziv coding technique, a table is employed which stores a list of previously encountered data blocks. A block currently being processed is compared with entries in the table. If the current block matches an entry in the table, the encoding module encodes the current block by making reference to the matching entry in the table—using a pointer, for example. The pointer itself may be transmitted instead of the entire data block. Preferably, the pointer is shorter than the block itself, thus resulting in compression of the data. When the pointer is received at a receiver site, the pointer may be used to reconstruct the data block, such as by making reference to a similarly constituted table at the receiver site.

The above discussed technique is best suited for digital information which exhibits a large amount of repetition. In such a case, component blocks comprising the data message often repeat, which increases the probability that a block currently being processed will match a previously encountered block.

However, prior art techniques such as that described previously fail to live up to their full potential in compressing digital messages. A data message may be segmented by an encoding system into component blocks which are out of step with the inherent repetition interval in the original data message. In this case, a search of the table of previously encountered blocks is less likely to reveal a match, and the data will not be optimally compressed. In such a case, the system has not fully exploited the inherent redundancy in the original data message.

This problem could be readily addressed if the interval at which data repeats in the original data message is known prior to encoding the data. This cycle interval (or step interval) could then be manually programmed into the segmenting algorithm. However, this approach is practical only if the size of the encoded blocks remains fixed. It is burdensome and impractical to reconfigure the algorithm for a new block size every time a new message is processed.

Moreover, a single data message may often contain distinct portions, each of which might exhibit a different repeating interval. The above technique is unsuitable for such a mixed data message, as it would require the user to reconfigure the algorithm midway through the processing of the data message.

For instance, a digital image may contain several different halftone portions. As understood in the art, halftone images are created by using a repeating finite two-dimensional halftone pattern. Each halftone image includes a plurality of halftone cells of fixed dimensions. A single page of digital image information might include a first half-tone portion using a first cell dimension, and a second half-tone portion using a second cell dimension. It would not be feasible for the user to manually determine the cell dimension employed in each distinct portion, and configure the segmenting algorithm to appropriately deal with the cell size of each distinct portion.

SUMMARY OF THE INVENTION

Accordingly, it is an object of the invention to provide a system and method for investigating digital data to determine if it contains information which is repeated at regular intervals, and for efficiently encoding the data using the same regular intervals.

In fulfilling this and other objectives, the present invention employs a process which moves an M×N window of contiguous pixels through a stream of digital data. The encoding system sequentially analyzes each window in the data. A window currently under analysis—referred to as the current window—is compared with the last encountered window image—referred to as the previous window. If the data in the current window does not match that in the previous window, two possibilities exist. The data in the windows simply may not contain redundant information. Alternatively, the data may contain redundant information, yet the windows fail to reveal that information. The system determines whether the latter scenario is correct by altering the current and previous windows and rechecking the altered windows to determine if they match.

More particularly, the system varies the size of the current window by increasing or decreasing one or more of its dimensions to create a pixel matrix of M'×N', and rechecking for a match between the modified current and previous windows. If a match occurs at the modified dimensions, the system instructs a loading module to segment the remainder of the data using the modified dimensions. In the event that no match occurs at the modified window dimensions, the system maintains the previous window dimensions when processing the remainder of the data.

After comparing the current and previous windows for the purposes of selecting the proper window dimension, the current window is encoded. Since the window has been selected to coincide with the natural repetition of the image, the current window has an improved chance of matching a previous window. If a match occurs, the window is encoded by reference to the matching previous window. Preferably, the referencing technique employs a form of Huffman encoding, thereby ensuring optimal compression of window information.

If a change in a window dimension was required to make the match, the system embeds supplemental information into the compression code to inform a decoder at a receiving site of the dimension change.

In one embodiment, the decoder alters the window dimension by changing only the width of the window—referred to hereinafter as a step change. In other embodiments, the change may be implemented in the height dimension. In still another embodiment, the change may take place in both the height and width dimensions.

BRIEF DESCRIPTION OF THE DRAWINGS

These and other objects and features of the invention will become more apparent from the ensuing discussion, in conjunction with the accompanying drawings. Like numerals designate like parts or steps.

FIGS. 3(a), 3(b) and 3(c) illustrate the basis for comparison between windows of data using step rates of 6, 8 and 10 pixels per step, respectively.

FIG. 4 provides a truth table outlining the manner of changing a step rate in response to comparison of image windows at step rates of 6, 8 and 10 pixels per step.

DESCRIPTION OF THE PREFERRED EMBODIMENTS

The present encoding system and method may generally be employed to efficiently encode a variety of different types of data for transmission or storage. By way of example, the encoding technique may be used to encode half-tone images for efficient transmission to a printer, facsimile, or simply for database file storage. Although not limited thereto, the present invention is well-suited for the compression of this type of data and therefore, to facilitate discussion, it will be explained within the context of image data compression.

Figure 1:
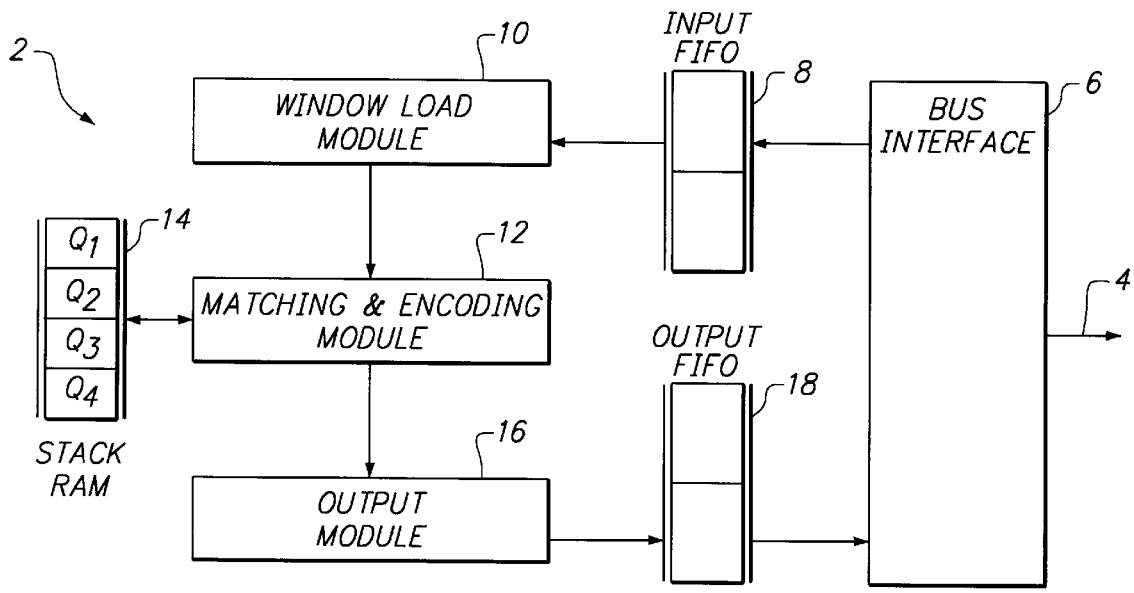
FIG. 1 is a general block diagram of a data compression unit, which according to one exemplary embodiment, may be employed to implement the present invention.

FIG. 1 illustrates an overall block diagram of a data compression unit (2) in which the present invention might be implemented. The compression unit (2) may preferably be implemented on a single integrated circuit chip for enhanced performance and marketability. However, as those having skill in the art will readily appreciate, the functions described herein may be implemented using any combination of distinct units, or by a software-driven processing unit.

The functions performed by the compression unit (2) may be divided into the four following principal tasks: 1) image loading; 2) step rate selection; 3) matching and encoding; and 4) output and formatting. The present invention is particularly concerned with the third task, matching and encoding. For a more thorough understanding, the other functions of the compression unit will be briefly described. Broadly speaking, the image loading function is performed by an input FIFO (8) and a window load module (10), and serves to download blocks of image data from a suitable memory (not shown) for processing by a matching and encoding module (12). A step rate selection function, which is based upon the present invention, is carried out with respect to the data to be passed from the window loading module 10 to the encoding module 12. This function examines the data in the blocks of data downloaded by the window load module (10), and changes the length of an encoding window to coincide with any detected repetition of image data from one window to the next. The matching and encoding function performs the actual task of encoding the data in the windows. In the final step of the process, an output module (16) converts the coded data into a format suitable for output. These functions will be described in greater detail in the ensuing detailed discussion.

Image Loading

As shown in FIG. 1, the compression unit (2) is connected to a system bus (4) via a bus interface (6). In an exemplary embodiment, the compression unit functions as a slave processor, and compresses data when so commanded by a host system, such as a print controller. When so instructed, the compression unit (2) downloads image data from memory accessible via the bus (4), such as system DRAM (not shown), for storage in the input FIFO (8). The input FIFO (8) preferably includes two memory sections. The first section of the FIFO (8) is filled first, upon which a FIFO Valid bit is set. The compression unit (2) then attempts to fill the second section of the FIFO (8), depending on the availability of the bus.

Figure 2:
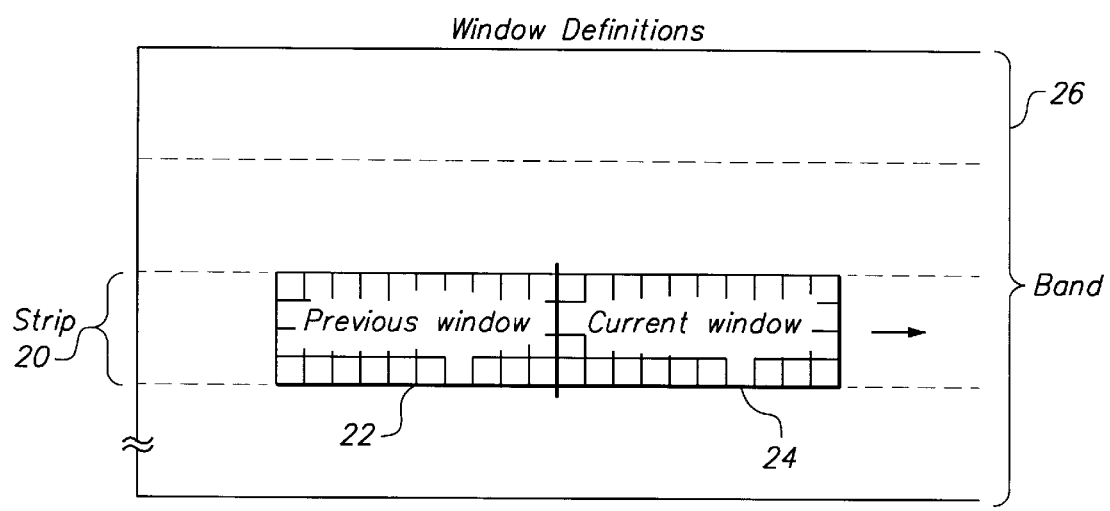
FIG. 2 illustrates various data unit definitions used in the specification.

Upon detecting FIFO Valid bits, the window loading module (10) loads blocks of data from the two sections of the input FIFO (8), in an alternating manner. FIG. 2 illustrates two blocks of data (22, 24) that have been read from the input FIFO (8). In some imaging techniques, a page of image data stored in system DRAM is divided into a plurality of bands. As illustrated in FIG. 2, each band (26) may be broken down into strips (20) comprising four raster lines each in height. A block (e.g. 24) is a portion of a strip (20), typically having a length of 10 pixels in an exemplary embodiment. A window, as the term is used in the specification, is a predetermined portion of the block, typically having a width of 6, 8 or 10 pixels. In FIG. 2, the windows (22, 24) have a width of 10 pixels, and therefore are equivalent to the image blocks. In FIG. 3(a), in contrast, the windows have a width of 6 pixels, whereas the block maintains a length of 10 pixels.

In an exemplary embodiment, each pixel within the window can be encoded using three bits. These three bits can be used to identify eight different values for each pixel. Five of these values might be allocated to describing five gray levels of image. One value is used to identify a bilevel (solid black) text pixel. Another value identifies a bilevel image pixel. The remaining value describes a white pixel. Accordingly, each window may be viewed as three-dimensional. The window height consists of four raster lines of information, the width consists of 10 pixels, and the depth consists of the three-bit value used to encode the value of the pixel.

It will be appreciated, of course, that the three-bit encoding described herein is merely illustrative. The principles of the invention can be applied to any desirable type of encoding process.

In operation, the window load module 10 sends two adjacent blocks of data to the matching and encoding module 12. At the beginning of a strip, therefore, the two blocks consist of the first twenty consecutive pixels in each raster line (if a block having a length of ten pixels is employed). During the next cycle, the positions of the blocks are shifted by an amount equal to a step rate value. In the preferred embodiment, the step rate can have a value of 6, 8 or 10 pixels, which correspond to common halftone cell dimensions. Thus, if the step rate is six, the next two blocks that are sent to the module 12 comprise the seventh thorough sixteenth and seventeenth through twenty-sixth pixels in each raster line, respectively. Conversely, if the step rate is ten, the second set of two blocks would comprise the eleventh through twentieth, and twenty-first through thirtieth pixels in each raster line, respectively. The positions of the blocks continue to be shifted in this manner, during each cycle of the encoding process. Thus, during each cycle the module 12 is provided with a number of new pixels equal to the step rate, for each raster line.

Step Rate Selection

Once the two adjacent blocks are loaded, the matching and encoding module (12) first checks for an exact match between pixels in a current window (24) and pixels in the window which immediately preceded the current window—referred to as the previous window (22). As described above, image data will often exhibit a repetitious nature depending on the nature of the font used to generate the text or a half-tone matrix that was used to render the image. Accordingly, the current and previous windows are compared to determine whether the prevailing step rate is equivalent to the natural cycle of information in the image.

In the illustrated example, each current and previous block is 10 pixels in length. For each pair of blocks, three sets of abutting windows are compared, in accordance with the three possible step rate values. For a step rate of 6 pixels/step, a 6×4 current window and an abutting the 6×4 previous window are compared, as illustrated in FIG. 3(a). For a step rate of 8 pixels/step, an 8×4 current window is compared against an abutting 8×4 previous window, as illustrated in FIG. 3(b). Finally, for a step rate of 10 pixels/step, the entire current block is compared with the previous block, as illustrated in FIG. 3(c). Preferably, these three comparisons are carried out in parallel for each new pair of downloaded blocks.

The results of the above procedure are illustrated in truth table format in FIG. 4. For instance, the middle section of the table (Current Step rate=8, rows 6–10) identifies how the encoding module responds to matches at window widths of 10, 8 and 6. A "1 " entry in the table in the Match section indicates a match has occurred. As shown, a match at 8 (denoted by a "1" entry under the 8 match column) will prompt the system to maintain its current step rate. A match at 6 will prompt the system to switch to a lower step rate. A match at 10 will prompt the system to switch to a higher step rate.

The entry "CV" for "Constant Value" denotes that the window includes all 1s or all 0s (e.g. is all black or all white). In this case, the table instructs the system to maintain the current step rate. More specifically, a block of constant values is a poor indicator of the natural cycle of the image, because a large portion of white or black space would provide a match at all step rates of 6, 8 and 10. In the event of a constant value window, a change in step rate is inhibited to allow a more consistent lock on the half-tone frequency. That is, the system will wait until it finds a window containing both 1s and 0s before switching to a higher or lower step rate.

The coding for Current Step Rates of 6 and 10 pixels/step is similar to that identified for the case of 8 pixels/step. The coding for Current Step Rates of 6 and 10 pixels/step is shown in the top and bottom sections of FIG. 4, respectively. If no match occurs at any of the three step rates, the current rate is maintained, since there is no information to indicate that a change in the inherent characteristics of the image data has occurred. After each comparison, an updated step rate value is supplied to the window loading module 10, to determine which pixels are to be provided in the previous and current blocks for the next cycle.

In the foregoing discussion, the window was changed only in the width dimension. However, the window may be altered in any number of ways in attempt to duplicate the natural repetition of the input image. In one embodiment, the height of the window may be changed. In another embodiment, both the width and the height of the window may be changed. Still other embodiments would allow for more complex alterations in the shape of the window.

Furthermore, the present invention is not limited to identifying repeating patterns in halftone images. The invention may be extended to any type of data which contains redundancy appearing at set intervals. For instance, the present invention may be used to identify repetition in a document due to the use of a particular font. In such a case, different dimensions may be employed for the sizes of the blocks and windows.

Matching and Encoding

Figure 5:
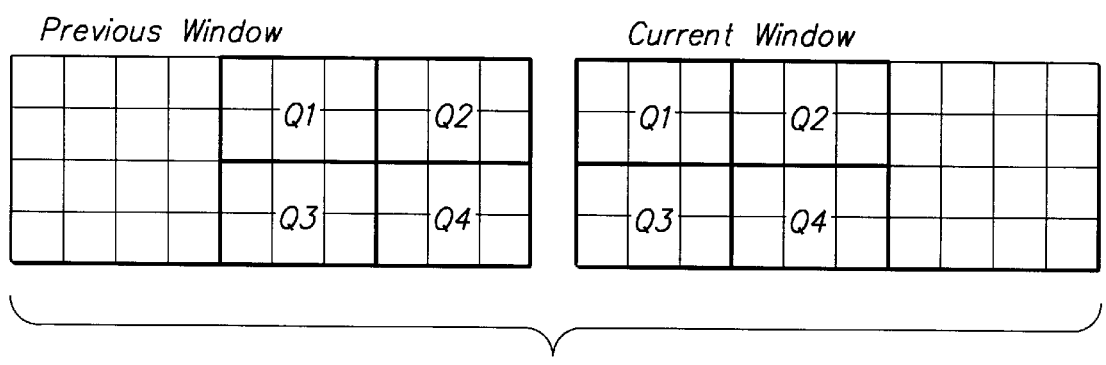
FIG. 5 illustrates the division of a window into quadrants.

Having chosen the step rate, the matching and encoding module (12) performs the task of actually coding the windows for transmission. In one preferred embodiment, it begins by dividing the window into quadrants as illustrated schematically in FIG. 5 (showing quadrant divisions using a step rate of 6 pixels per step). The window is processed one quadrant at a time.

In general, the matching and encoding module (12) employs three principal hierarchical phases in coding the quadrants. First, the module (12) compares a given quadrant from the current window with the corresponding quadrant from the immediately previous window. If a match is found, pixel values comprising the current quadrant do not have to be included in the encoded output data stream. The encoding module (12) simply sends a bit informing the decoding module that the quadrant matches the corresponding quadrant from the previous window.

If a match is unavailing, however, the encoding module (12) enters the second phase of its examination. In the second phase, the unmatched current quadrant is compared with a stored list of previously encountered image quadrants, starting from the second-to-last recently encountered image quadrant (the immediately proceeding image quadrant having already been checked, as described above). If a match is found between the current quadrant, and an entry on the list, then the quadrant is coded by making reference to the entry on the list. The list may be stored using a stack table (14) (FIG. 1). Again, if a quadrant matches an entry on the list, only the code referencing the matching entry on the list needs to be transmitted to the decoder (not shown).

If a match is still unavailing, the encoding module (12) enters the third phase of its examination. In the third phase, the unmatched current quadrant is examined to determine if it falls into one of the following categories: bilevel text, bilevel image, one-gray value image, and multiple gray value image. Bilevel text consists of binary data (comprised of pixels which assume one of two values—1 or 0). Bilevel image data also consists of binary data, but is tagged as "image" data to distinguish it from simple text data. It is useful to distinguish between the two because processing performed on bilevel text data (e.g. after the data has been decoded) may not be appropriate for bilevel image data, and vice versa. A one-gray value image is a quadrant which contains only one gray level pixel amongst the bilevel pixels. A gray level pixel can assume more than two values, and therefore requires more than one bit to specify. Finally, a multiple gray value image consists of a quadrant containing more than one gray-level pixel.

The three phases of coding described above ensure that the shortest possible code is assigned to the quadrants of the window. The shortest code is assigned to a quadrant which matches the last-encountered window quadrant. The next shortest codes are assigned to those quadrants matching entries in the stack (14). The next shortest codes are assigned to bilevel data quadrants, one-gray level quadrants, and multiple gray-level quadrants—in that order. Furthermore, the length of the code corresponds to the likelihood that a quadrant will fall into one of the above possibilities. The shorter the code, the more likely the chance of match. Specific coding is assigned using a Huffman encoding tree, as discussed in "Variable Encoding Based on Image Content" (application Ser. No. 08/644,354), filed May 10, 1996, which is incorporated by reference herein.

When a step rate change occurs, the encoding module (12) must inform the decoder (not shown) of that fact. For instance, the decoder may contain decoding logic which corresponds to the encoding procedure identified above. It is necessary that both the encoder and decoder are operating using the same parameters—especially the step rate parameter.

When a step change is required, the encoder transmits a predetermined code which informs the decoder that a change has occurred. For instance a code of [0011] may be used to inform the decoder that it should convert to a higher step rate change, while a code of [1100] may be used to inform the decoder that is should convert to a lower step rate change. The specific codes, of course, are not critical to the inventive premise.

Output and Formatting

Once the matching and encoding module has completed its task, it checks whether the output module has set a barrel-ready signal, indicating that a barrel shifter (not shown) of the output module (16) is ready to receive the coded data stream. If so, the coded data stream is forwarded to the output module (16) which packs the data into 32-bit words to be loaded into an output FIFO (18), using the barrel shifter.

The output module (16) forwards the code words to the output FIFO (18), which like the input FIFO, contains two memory sections. While one section is being loaded by the barrel shifter, the other section, if full, is written out to the system bus 4 for transmission and/or storage in memory. The output FIFO sets an output FIFO Full bit to inform the interface logic to write the output bit stream to the system bus.

The present invention with its novel encoding scheme has been described in full within the exemplary context of image data compression. However, as discussed above, the present invention is not limited to encoding image data.

Further, various changes and modifications will be apparent to those skilled in art. Unless these modifications and changes depart from the scope and spirit of the present invention, they are considered encompassed by the appended claims.

What is claimed is:

1. A system for processing digital data including:
    a loading module for segmenting the digital data into first and second data groupings;
    an encoding module for comparing said second data grouping with said first data grouping, and for discriminating whether said second data grouping matches said first data grouping; and
    in the event said second data grouping does not match said first data grouping, said encoding module modifying said first and second groupings, and comparing said modified second grouping with said modified first grouping.

2. A system for processing digital data according to claim 1, wherein:
    said digital data comprises digital image data, and said first and second groupings comprise first and second sets of pixel data, respectively.

3. A system for processing digital data according to claim 2, wherein said first and second groupings both consist of M×N windows of image pixels, forming, respectively, first and second windows.

4. A system for processing digital data according to claim 3, wherein, said encoding module modifies said first and second groupings by changing at least one dimension of each of said first and second windows.

5. A system for processing digital data according to claim 1, wherein said encoding module modifies said first and second groupings by changing the amount of data in each of said first and second groupings.

6. A system for processing digital data according to claim 1, wherein said encoding module discriminates whether said modified second grouping matches said modified first grouping, and if not, further modifies said first and second data groupings.

7. A system for processing digital data according to claim 1, wherein said encoding module discriminates whether said modified second grouping matches said modified first grouping, and if so, configures said loading module to subsequently segment said digital data into data groupings resembling said modified first and second groupings.

8. A system for processing digital data according to claim 7, wherein said encoding module further formulates a message for transmission to a decoder apparatus, said message instructing said decoder apparatus to segment said digital data into data groupings resembling said modified first and second groupings.

9. A method for processing digital data including:
    segmenting the digital data into first and second data groupings;
    comparing said second data grouping with said first data grouping and discriminating whether said second data grouping matches said first data grouping;
    in the event said second data grouping does not match said first grouping, modifying said first and second groupings;
    comparing said modified first and second groupings, and discriminating whether said modified second grouping matches said modified first data grouping.

10. A method for processing digital data according to claim 9, wherein:
    said digital data comprises digital image data, and said first and second groupings comprise first and second sets of pixel data, respectively.

11. A method for processing digital data according to claim 10, wherein said first and second groupings both consist of M×N windows of image pixels, forming, respectively, first and second windows.

12. A method for processing digital data according to claim 11, wherein said modifying step modifies said first and second groupings by changing at least one dimension of each of said first and second windows.

13. A method for processing digital data according to claim 9, wherein said modifying step modifies said first and second groupings by changing the amount of data in each of said first and second groupings.

14. A method for processing digital data according to claim 9, including the step of further modifying said first and second data groupings if said modified second grouping does not match said modified first grouping.

15. A method for processing digital data according to claim 9, including the step of subsequently segmenting said digital data into data groupings resembling said modified first and second groupings if said modified second grouping matches said modified first grouping.

16. A method for processing digital data according to claim 15, including the step of formulating a message for transmission to a decoder apparatus, said message instructing said decoder apparatus to segment said digital data into data groupings resembling said modified first and second groupings.

17. A method for encoding a sequence of digital data, comprising the steps of:

selecting two blocks of data;

for each block of data, defining a plurality of data windows of different respective sizes;

comparing each window of data in one block with a corresponding size window of data in the other block, to determine whether the data in the two compared windows matches;

encoding the data in one of said windows; and selecting two subsequent blocks of data in accordance with the sizes of corresponding windows in which matching data was found.

18. The method of claim 17 wherein said two blocks of data comprise consecutive units of data in said sequence, and wherein the two subsequent blocks of data are shifted along said sequence by an amount related to the size of the windows in which matching data was found.

19. The method of claim 17 wherein at least three different size windows are defined for each block of data.

20. The method of claim 17 wherein said comparing step is carried out in parallel for each of the different sizes of windows.

* * * * *